United States Patent

Schildkraut et al.

[15] 3,655,482

[45] Apr. 11, 1972

[54] BONDING METHOD AND PRODUCT

[72] Inventors: Sid I. Schildkraut, Flushing; Albert L. Yates, Huntington Station; Peter J. Cohn, New York, all of N.Y.

[73] Assignee: Edo Corporation, College Point, N.Y.

[22] Filed: Dec. 23, 1969

[21] Appl. No.: 887,775

[52] U.S. Cl. .............................................. 156/276, 156/292

[51] Int. Cl. .............................................. B32b 31/00

[58] Field of Search .................... 156/62.2, 276, 292; 161/87

[56] References Cited

UNITED STATES PATENTS

| | | | |
|---|---|---|---|
| 2,489,466 | 11/1949 | Schramm, Jr. | 156/276 X |
| 2,646,364 | 7/1953 | Porth | 156/276 X |
| 2,592,882 | 4/1952 | Fisher et al. | 156/276 X |

*Primary Examiner*—Carl D. Quarforth
*Assistant Examiner*—S. R. Hellman
*Attorney*—Davis, Hoxie, Faithfull & Hapgood

[57] ABSTRACT

A process for adhering smooth mechanical surfaces via an intermediate adhesive of a predetermined thickness includes mixing spherical particles of a size comparable to the desired thickness with the adhesive. The adhesive-particle mixture is deposited between the surfaces and the adhesive cured, sufficient pressure being applied to effect only a single plane of the particles.

5 Claims, No Drawings

BONDING METHOD AND PRODUCT

This invention relates to bonds and bonding methods and, more specifically, to an improved adhesive bond and bonding procedure for uniformly maintaining adhesive thickness within prescribed tolerances.

The thickness of an intermediate cement or other adhesive layer securing two elements together is often important. For example, the tensile strength of many cements depends upon its thickness when cured, there typically being an optimum thickness or preferred thickness range. For many applications, the materials to be fastened exhibit substantial surface porosity or irregularities. Thus, a satisfactory bond of adequate thickness may readily be effected when two surfaces are adhered, the adhesive simply penetrating within the surface undulations and hardening in place to form a chemical and/or mechanical bond.

However, where finely prepared uniform surfaces are to be joined, such as two piezoelectric elements of a transducer, it has heretofore been difficult to maintain a desired glue thickness. When the two transducer elements are pressed together during bonding, the mating smooth, polished surfaces tend to squeeze out most of the adhesive. This leaves less than the desired amount of cement and, in some cases, not enough for even minimal bonding.

The bonding problem is especially critical for the manufacture of transducers by reason of bond thickness dependent parameters in addition to mechanical strength. Thus, for example, the natural resonant frequency and frequency band pass response characteristics of a transducer depend upon the adhesive thickness between contiguous piezoelectric elements.

It is thus an object of the present invention to provide an improved method for joining two members via a bond of closely controlled thickness, and to provide the bond produced thereby.

More specifically, an object of the present invention is the provision of a reliable method for bonding two smooth, nonporous conformal surfaces; shaped, undulating or flat, e.g., on mating piezoelectric transducer elements, with a controlled adhesive thickness.

The above and other objects of the present invention are realized in an illustrative bond and bonding process for fastening two elements, e.g., two hollow piezoelectric transducer cylinders, with a predetermined adhesive thickness. Plastic particles, e.g., of substantially spherical form, are sorted to select those having a diameter corresponding to the desired cement thickness. The plastic balls are then mixed with the cement, and the cement-particle mixture deposited on one or both surfaces to be fastened.

Pressure is applied to the piezoelectric members such that the two elements are separated by a single plane of particles (surrounded by adhesive), thus effecting the desired adhesive thickness when the adhesive hardens.

The above and other objects, features and advantages are realized in a specific, illustrative, process for fabricating an improved bond between two members, e.g., hollow piezoelectric cylinders formed of barium titanate, lead zirconate, or the like, and to the bond created thereby. The cylinders are to be bonded end-to-end with an adhesive thickness of approximately .002–.003 inches, each of the facing surfaces being highly polished and carefully prepared by reason of mechanical and electrical considerations.

To effect the desired cement thickness, particles, preferably spherical, approximately spherical, oval, or other curved or noncurved form having a diameter (smallest diameter for nonspherical particles) in the range .002–.003 inches corresponding to the end cement thickness, are secured. The particles may be obtained by employing a particle analyzer and sorter, or by selecting those particles of an initial assortment which pass through a screen with .003-inch apertures, and which do not pass through a .002-inch apertured screen.

For the ceramic transducer application, the particles may advantageously be made of a suitable plastic material, such as methyl methacrylate resin (e.g., as sold under the trademark Lucite by the DuPont Corporation). As discussed below, the particle material should be softer than the surfaces to be bonded, and may advantageously have a modulus of elasticity approximately matching that of the cured cement.

The particles are mixed into the cement, or into one of the cement constituents. The cement may comprise epoxy resin for the transducer application. The relative proportions of the cement and particles may vary widely - mixtures including 1 and 8 percent of the particles by volume have been successfully employed. The particles may be of a color contrasting with the adhesive to provide a visual means for approximating the relative portions of the particles and the cement mix. The cement-particle mixture is applied to one or both surfaces to be adhered, and pressure is applied to the joint. The pressure obviates any stacking (multiple layers) of the particles, such that the area between the surfaces comprises a single plane of particles, each having a diameter in the range between two and three mills, thus effects the desired transducer inter-element spacing within the range of .002–.003 inches.

Unlike prior bonding techniques, the applied pressure is not critical. The pressure must simply be enough to keep the particles in place during cement curing, and not enough to fracture the particles. Since the particles are softer than the transducer material, the applied pressure cannot damage or indent the transducer surfaces. There is no possibility of squeezing the adhesive out of the joint since the surfaces cannot meet.

The cemented joint is allowed to cure until the adhesive hardens to complete the bonding process.

As noted above, the particle materials for the transducer application may advantageously be chosen to exhibit a modulus of elasticity approximately equal to that of the hardened adhesive. This avoids the possibility of developing stress concentrations in the ceramic material beneath the plastic particles, with possible damage to the piezoelectric material or distortion of its electrical output, as the ceramic changes dimension during its transducing function. For other applications, other properties of the particles and cement may be matched, e.g., their thermal coefficients of expansion to obviate stresses produced by temperature changes, or their electrical resistivities.

Thus, the above-described process gives rise to a uniform adhesive bond of controlled thickness.

The above-described process and product produced thereby are only illustrative of the principles of the present invention. Numerous modifications and adaptations thereof will be readily apparent to those skilled in the art without departing from the spirit and scope of the present invention. For example, the particles may be added to the cement after the adhesive has been applied to the mechanical element(s).

What is claimed is:

1. The method of bonding two surfaces with a layer of adhesive of uniform predetermined thickness which comprises forming a mixture of adhesive with solid particles of a size presenting a dimension which approximates said predetermined thickness, interposing said mixture between the opposed surfaces, and moving the surfaces toward each other to eliminate stacking of the particles by re-distributing the particles into a single plane, thus limiting the movement of the two surfaces toward each other when their separation reaches the said dimension.

2. The method as in claim 1 wherein the said movement is continued until a plurality of individual particles are abutted on opposite sides by both surfaces.

3. The process as in claim 1 wherein the particles are approximately spherical in form.

4. The process as in claim 1 wherein the surfaces to be bonded are smooth surfaces of predetermined hardness which includes the step of forming a mixture of adhesive and particles of a uniform size approximating said thickness and of a hardness which is less than that of the said surfaces.

5. A process of bonding two smooth surfaces of piezoelectric materials with a layer of adhesive of uniform predetermined thickness comprising forming a mixture of adhesive having a predetermined modulus of elasticity when cured with particles of a uniform size approximating said thickness and of a modulus of elasticity approximating that of the cured adhesive, interposing said mixture between the opposed surfaces, moving the surfaces toward each other to eliminate stacking of the particles by re-distributing the particles in a single plane, continuing said movement until individual particles are abutted on opposite sides by both surfaces, thus limiting the movement of the two surfaces to a dimension substantially equal to the desired uniform predetermined thickness of the adhesive.

* * * * *